(12) United States Patent
Dannoux et al.

(10) Patent No.: US 7,294,301 B2
(45) Date of Patent: Nov. 13, 2007

(54) DIE ASSEMBLY AND METHOD FOR FORMING HONEYCOMB FILTERS

(75) Inventors: Thierry Luc Alain Dannoux, Avon (FR); Michael Fischer, Corning, NY (US); Thomas Dale Ketcham, Big Flats, NY (US); Kenneth Richard Miller, Addison, NY (US); Robert John Paisley, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 11/153,711

(22) Filed: Jun. 14, 2005

(65) Prior Publication Data

US 2006/0006575 A1 Jan. 12, 2006

Related U.S. Application Data

(60) Provisional application No. 60/579,899, filed on Jun. 15, 2004.

(51) Int. Cl.
*B29C 47/00* (2006.01)
*B29C 47/12* (2006.01)

(52) U.S. Cl. .............. 264/177.12; 264/177.1; 264/171.1; 425/380

(58) Field of Classification Search .............. None
See application file for complete search history.

(56) References Cited

U.S. PATENT DOCUMENTS

| | | | |
|---|---|---|---|
| 3,274,315 A | 9/1966 | Kawamura | 264/93 |
| 3,668,288 A * | 6/1972 | Takahashi | 264/46.1 |
| 3,929,951 A * | 12/1975 | Shibata et al. | 264/566 |
| 4,293,357 A | 10/1981 | Higuchi et al. | 156/89 |
| 4,297,140 A | 10/1981 | Paisley | 428/310 |
| 4,329,162 A * | 5/1982 | Pitcher, Jr. | 55/523 |
| 4,420,316 A | 12/1983 | Frost et al. | 55/523 |
| 4,559,193 A | 12/1985 | Ogawa et al. | 264/60 |
| 4,884,960 A | 12/1989 | Chao | 425/97 |
| 5,160,684 A | 11/1992 | Misawa | 264/173 |
| 5,458,834 A | 10/1995 | Faber et al. | 264/109 |
| 5,750,026 A * | 5/1998 | Gadkaree et al. | 210/502.1 |
| 6,541,407 B2 | 4/2003 | Beall et al. | 501/119 |

* cited by examiner

Primary Examiner—Christina Johnson
Assistant Examiner—Jeff Wollschlager
(74) Attorney, Agent, or Firm—Joseph M. Homa; Randall S. Wayland

(57) ABSTRACT

A method for forming honeycomb structures, such as wall-flow honeycomb filters, which utilizes extrusion of multiple material supplies at once. Such methods may be used to form intermittent plugs or other structures in the cell channels during the extrusion process, for example. A die assembly is provided which includes secondary feedholes machined in the pins for intermittently or periodically injecting secondary material (e.g., plug material) into the cell channels of the honeycomb structure while it is being extruded.

5 Claims, 10 Drawing Sheets

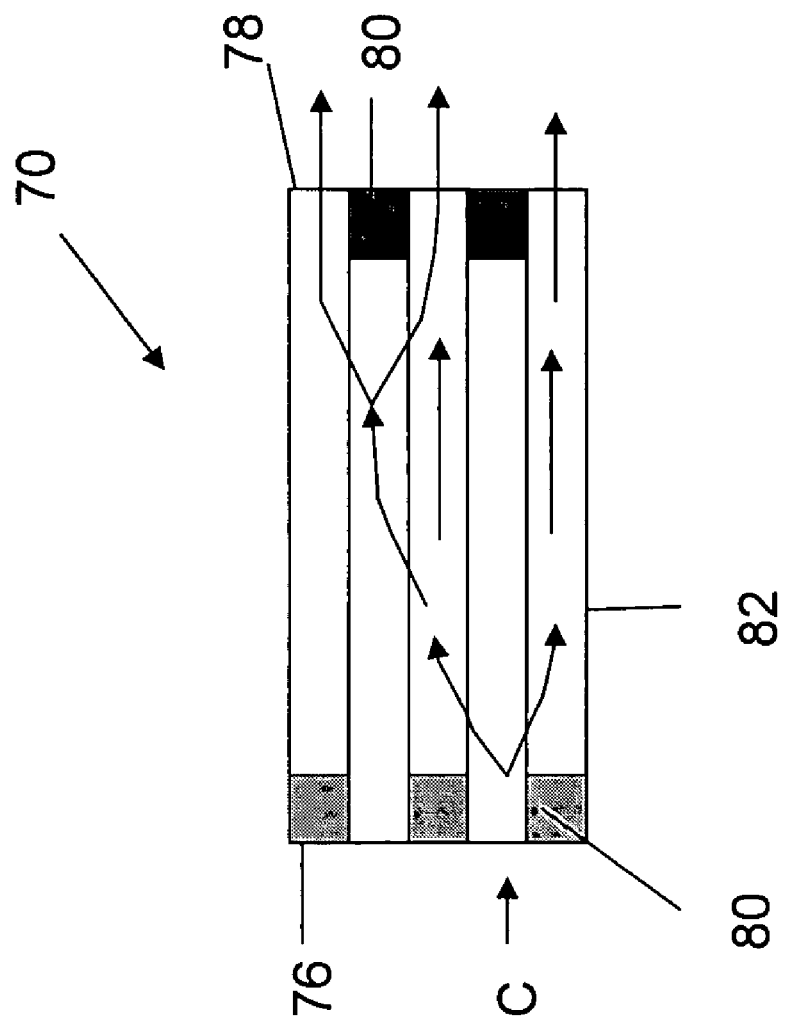

DIE ASSEMBLY AND METHOD FOR FORMING HONEYCOMB FILTERS

This application claims the benefit of U.S. Provisional Application No. 60/579,899, filed Jun. 15, 2004, entitled "Die Assembly and Method for Forming Honeycomb Filters".

BACKGROUND OF THE INVENTION

The present invention relates generally to dies for extruding honeycomb bodies and particularly to a method for forming filters, particularly solid particulate filters, such as a diesel exhaust filter.

Honeycomb structures are widely used as in a variety of applications relating to the purification of exhaust gases, including as substrates for catalytic converters and diesel particulate filters. A typical honeycomb structure has a columnar body, the cross-sectional shape of which is typically round or oval. An array of parallel, straight channels is formed by intersecting, interior walls. The channels run axially along the length of the columnar body. The cross-section of each channel can be of any arbitrary shape, but is frequently square.

Extrusion has long been the process of choice for forming honeycomb structures. Conventional dies comprise a feed or inlet section, provided with a plurality of feedholes for the input of a plastic batch material to the die, and a discharge section connecting the feed section for reforming and discharging the material from a discharge face of the die. The discharge openings on the discharge face are formed by criss-crossing array of long straight discharge slots of equal spacing. These long slots intersect to form a network of shorter slot segments which are used to form the cell walls.

Plastic material processed through these dies follow a complex flow path. The material first moves from each feedhole through a transition zone into the base of the slot array, where it flows laterally to join with knit material from adjacent feedholes. Thereafter, the knitted material is again directed forwardly in the direction of feedhole flow toward the discharge opening formed by the slots, being discharge therefrom in the form of an array of interconnecting "webs" or wall portions forming the channels walls of the honeycomb. The cross-sectional shapes of the pins formed on the discharge face by the interconnecting slot segments govern the internal shapes of the channels in the extrudate, and are typically square.

Honeycomb structures have cellular densities which are tailored to specific applications. For diesel particulate filters, cellular densities range between 100 and 300 cells/in$^2$ (15.5 and 46.5 cells/cm$^2$), and more typically 200 cells/in$^2$ (31 cells/cm$^2$) for diesel exhaust filters. Cell wall thicknesses vary between 0.001 to 0.025 in (0.25 to 0.64 mm), and more typically 0.019 in (0.486 mm).

In diesel exhaust filtration, honeycomb structures are plugged at both end faces in a checkerboard pattern. Specifically, alternating cells on one end face of the honeycomb are plugged with a ceramic filter material, and pattern is reverse on the opposite side, so that the ends of each cell are blocked at only one end of the structure. Consequently, when diesel exhaust enters the filter through one end face (i.e., inlet end), it is forced to pass through the porous walls in order to exit through the opposite end face (i.e., outlet end). Hence, diesel particulate filters of this kind are known as wall-flow filters. U.S. Pat. No. 4,420,316 to Frost el al. discusses cordierite wall-flow filters in more detail.

In the manufacturing of wall-flow filters, the honeycomb structures are first extruded as discussed above, and then in a separate step from the extrusion operation, the honeycombs are manually plugged. Specifically, a mask is fitted over one end of the honeycomb and then a paste is spread over the covered end face to fill in the exposed cells. The same process is repeated on the opposite side. This plugging process is labor-intensive and inefficient. Masks are applied manually to the honeycomb ends, and then must be cleaned after each use. The cement batch is time, shear and temperature dependent, often being thrown out, unused due to age restrictions.

From the foregoing, there exists a need for a more efficient method for forming diesel particulate filters. In particular, it is desired to combine the steps of extrusion and plugging in a single operation, and to obtain a die assembly for achieving the same.

SUMMARY OF THE INVENTION

According to a first aspect, the invention relates to a die assembly for extruding a honeycomb body while at the same time feeding a secondary material (i.e., plugging or other material) into the honeycomb channels, preferably from more than one feed. Accordingly, in one embodiment the die assembly is used for forming diesel particulate filters in a forming process wherein during extrusion predetermined honeycomb channels are plugged periodically or intermittently.

The die assembly is preferably composed of a die body having an inlet face, an outlet face, and a honeycomb die region. The honeycomb die region includes an array of slots which define an array of pins which further include at least one set of secondary feedholes, preferably first and second sets of secondary feedholes. In addition the die assembly preferably includes a flow regulator, which is preferably at least one manifold plate, more preferably first and second manifold plates positioned downstream of the die body for supplying and intermittently regulating material to the secondary feedholes during extrusion. A manifold plate is preferably composed of channels and feedholes for the secondary material. The die assembly may further include an optional face plate mounted upstream the die body.

The first manifold plate is preferably positioned upstream of the die outlet face, and it functions to intermittently supply and regulate material from a first feed source to the first set of secondary feedholes. The second manifold plate is positioned adjacent the first manifold plate, and it functions to intermittently supply and regulate material from a second feed source to the second set of secondary feedholes.

According to a further aspect of the invention, a method of manufacturing a honeycomb structure is provided, comprising the steps of extruding a first material supply through a die to form a honeycomb log having a plurality of intersecting, interior walls forming parallel cell channels and throughout the step of extruding, intermittently regulating flow of a second material supply into the cell channels.

In the method of forming a diesel particulate filter, batch material is extruded through the die assembly described above to form a honeycomb log. A portion of the cell channels of the honeycomb structure are intermittently or periodically injected with plugging material, preferably from more than one feed source. The plugging material is being injected into the cell channels through the secondary feedholes as the honeycomb log is being extruded.

Subsequently the honeycomb log is cut in the region where the plugging material is injected in the cell channels, preferably about in the center thereof at an interface between the plugging material and cell channels, to form a honeycomb structure having a first portion of end-plugged cell channels at one end and a second portion of end-plugged cell channels at the other end, but not corresponding to the first portion. Accordingly, it should be recognized that plugs are formed during the extrusion process thereby dramatically simplifying plug formation.

In one embodiment the plugging material forms permanent plugs after drying. In another embodiment the secondary material injected into the cell channels contains a release agent, such as graphite, which burns-off during sintering. In this embodiment the plugging material forms temporary plugs after drying by preventing the plugging material from adhering to the cell channel walls. Therefore, prior to sintering a permanent plugging material is spread across the ends of the honeycomb structure to form permanent plugs in those cell channels which do not have the release agent-containing material.

BRIEF DESCRIPTION OF THE DRAWINGS

The various aspects of the invention may be more clearly understood with reference to the accompanying figures in which:

FIG. 5b is a sectioned view of the wall-flow filter of FIG. 5a showing exhaust flow therethrough; and, FIGS. 6a-c illustrate the process steps of an embodiment of a process of making a wall-flow diesel with the die assembly of FIG. 1.

DETAILED DESCRIPTION OF THE INVENTION

The invention will now be described in detail with reference to a few preferred embodiments. It should be recognized that the method and apparatus according to the invention allows a secondary material to be intermittently or periodically included in the cell channels. Intermittently, refers to either starting to stopping more than once in the extrusion cycle, such as to form a plug of material, for example. However, it should also be recognized that the invention may also be used to form intermittent sections where the cell channel is not completely blocked, for example. Periodic refers to inserting the secondary material at evenly spaced increments during extrusion, whereas intermittent may refer to either periodic or non-periodic intervals. Thus, it should be apparent that the invention is broadly adapted to produce honeycomb structures having intermittent structures formed in the cell channels during extrusion.

Figure 1:
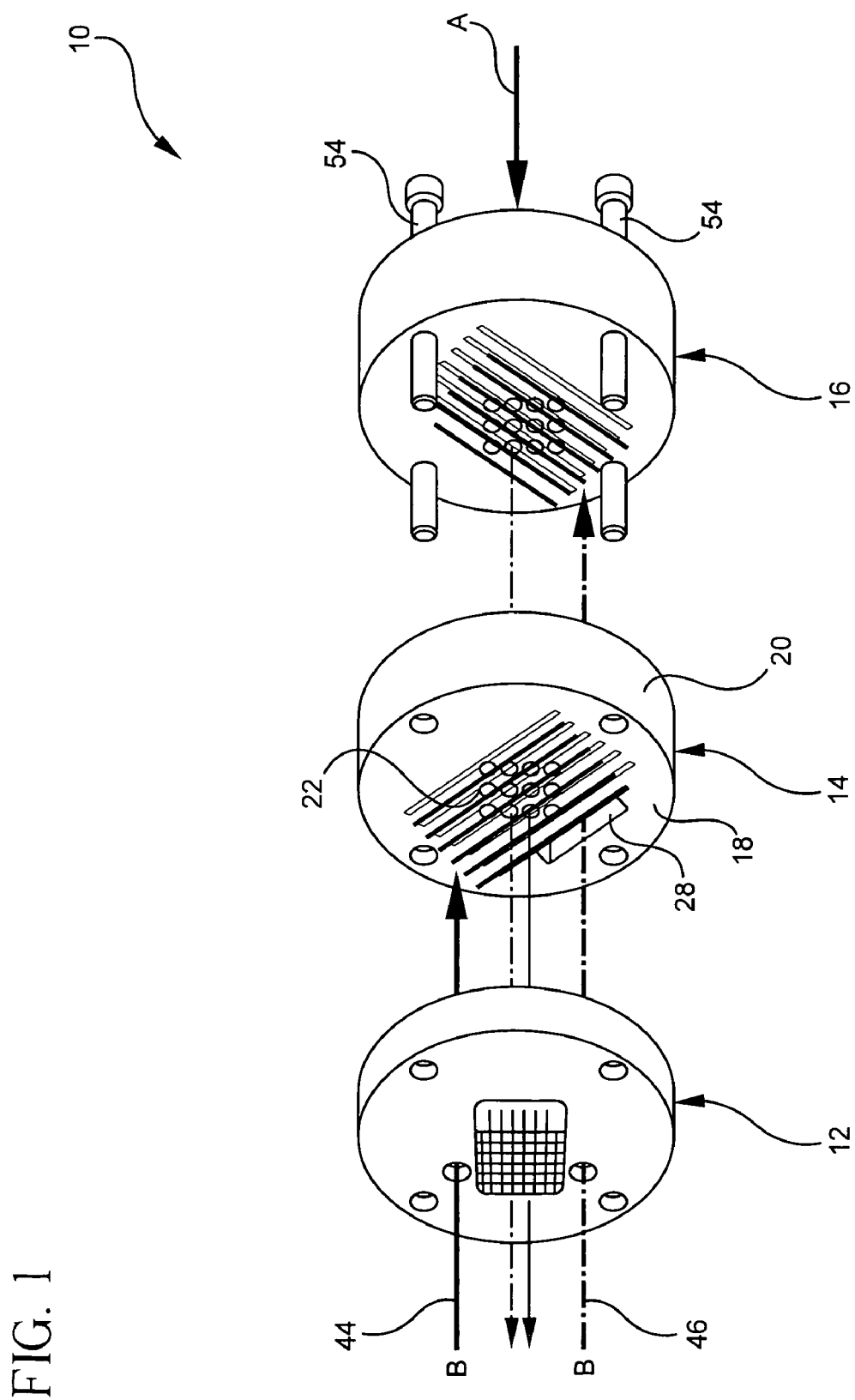
FIG. 1 is a schematic view of the components of a die assembly which can be used to extrude a honeycomb structure and at the same time introduce secondary material from two source feeds into the honeycomb cell channels.

Accordingly, shown in FIG. 1 is a die assembly 10 composed of a die body 12, a first manifold plate 14, and a second manifold plate 16. These components are held together by bolts 54. A face plate (not shown) may be optionally mounted to the die body as known in the art.

Figure 2:
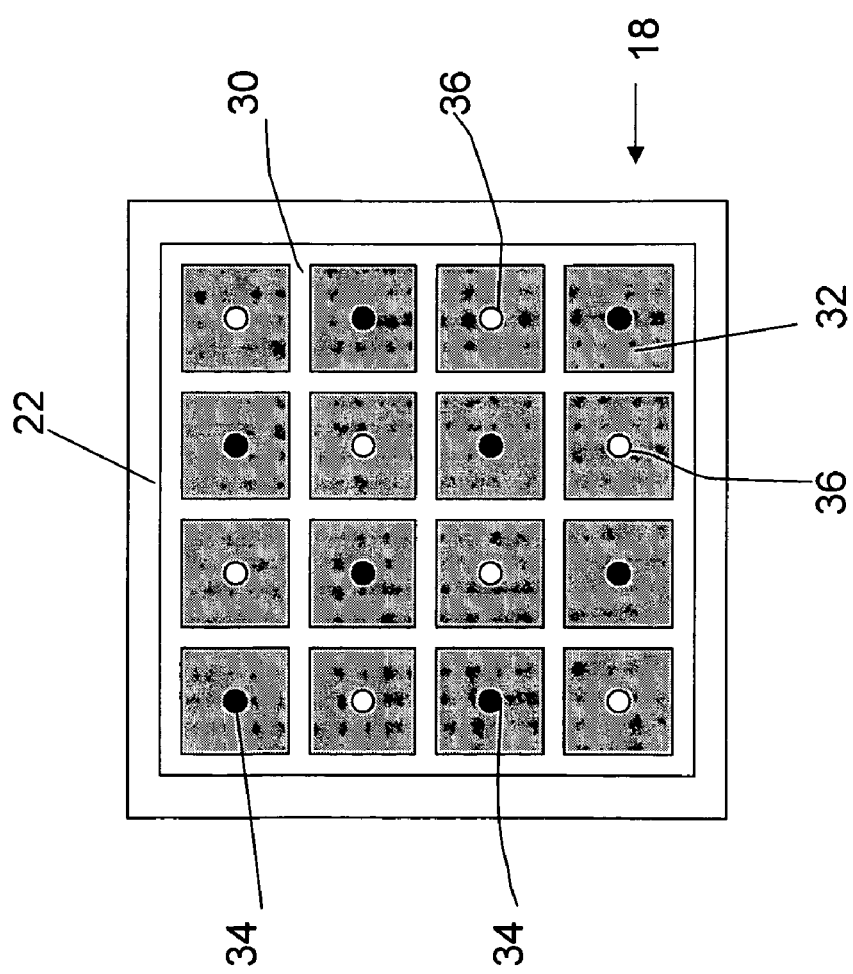
FIG. 2 is a top view of the front or outlet face of the die body showing first and second feeds, and a plurality of discharge slots intersecting at right angles and being formed by pins containing secondary holes, in which a first set of secondary holes is alternating with a second set of secondary holes across the front face thereof.

The die body 12 has an inlet face 18, an outlet face 20, and a honeycomb die region 22. Referring to FIG. 2, the honeycomb die region 22 has a square cross-section leading to the formation of square honeycomb substrates. However, generally dies can be round, oval or other appropriate shape for the target application.

The honeycomb die 22 includes an array of slots 30 which define an array of pins 32. Slots 30 act to form the webs (interior walls) of the honeycomb substrate. The transverse cross-section of the pins 32 is shown to be square, but other shapes common to honeycombs are also be suitable.

FIG. 2 further shows a first set 34 and a second set 36 of secondary feedholes formed in the center of pins 32. It is contemplated that the secondary feedholes can be formed off-center in the pins. The first set of secondary feedholes 34 preferably receives secondary material from a first source 44 which is in communication with the die body 12. The second set of secondary feedholes 36 preferably receives secondary material from a second source 46 of secondary material which is also in communication with die body 12. The embodiment is shown with two sources of secondary material, however, more feed sources and manifold plates can be added, particularly to intermittently or periodically introduce a plurality of materials in various honeycomb cell channels. Moreover, only one may be used if only one material is to be intermittently added into the cell channels.

The secondary feedholes act to supply secondary material (i.e., batch, plugging or other material) to the interior of the honeycomb cell channels. In the embodiment of FIG. 2 first and second secondary feedholes alternate in every other pin. However, other arrangements are contemplated to be suitable depending on the target application. The size of the secondary feedholes is only limited by the size of the extruded honeycomb channels. Although shown of equal size, it is also envisioned that secondary feedholes and manifold channels may be non-equal in size. Moreover, the material from the first and second sources may be the same or different from each other and the same of different from the material forming the walls.

Figure 3:
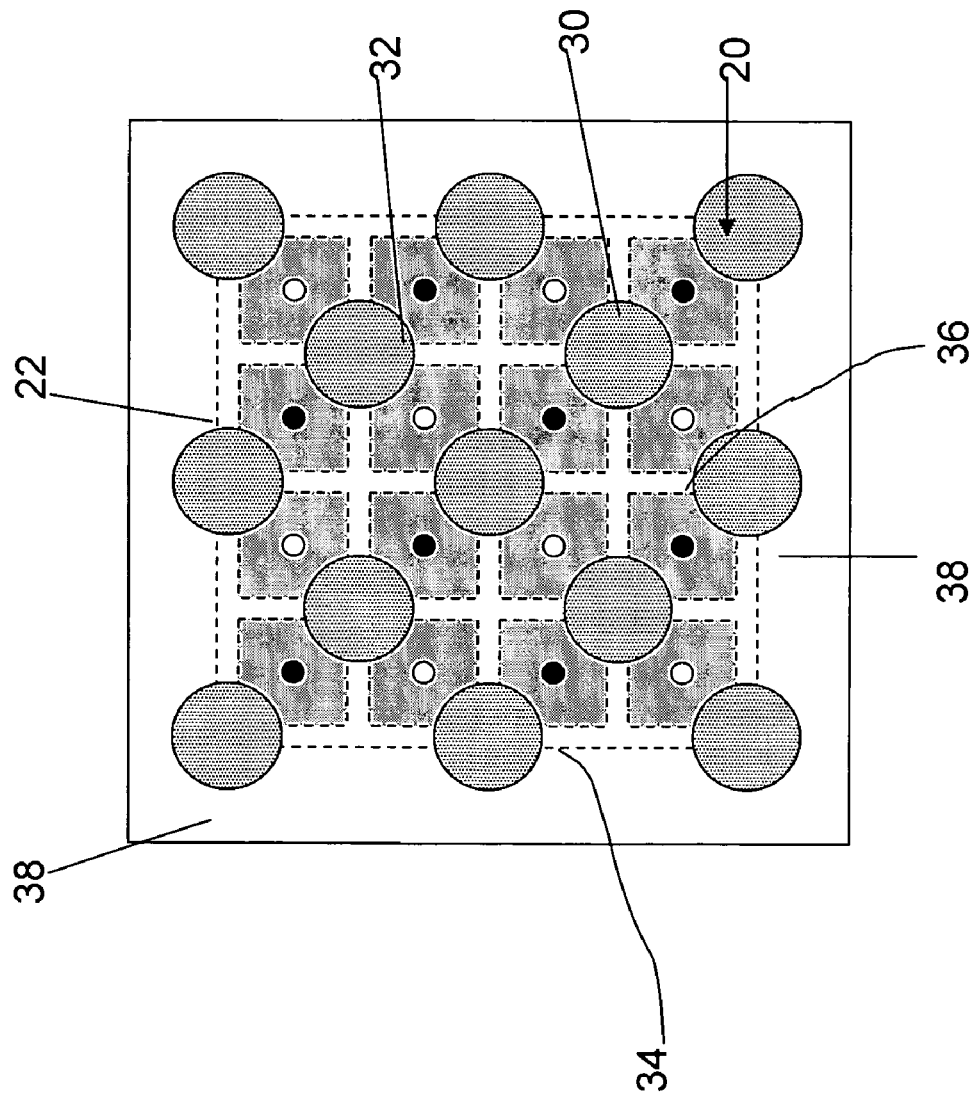
FIG. 3 is a top view of the back or inlet face of the die body showing a plurality of primary feed holes in communication with the discharge slots on the front or outlet face of the die body, and alternating first and second secondary holes in the middle of the pins (shown in phantom)

An array of primary feedholes 38 exists at the die outlet face 20, as shown in FIG. 3. The primary feedholes 38 are in direct communication with slots 30 at the die inlet face 18, and act to supply batch material thereto. The batch material may be different from the secondary material, and is used to form the honeycomb structure.

FIG. 3 also shows the locations of the first 34 and second 36 sets of secondary feedholes with respect to the primary feedholes 38, as well as slots 30 and pins 32 (shown in phantom). The size and location of the primary feedholes 38 relative to slots 30 are selected to achieve desired rate of flow through slots 30. As an example, a primary feedhole 38 may correspond to each or every other slot 30 or may correspond to each or every other intersection of slots 30.

Figure 4A:
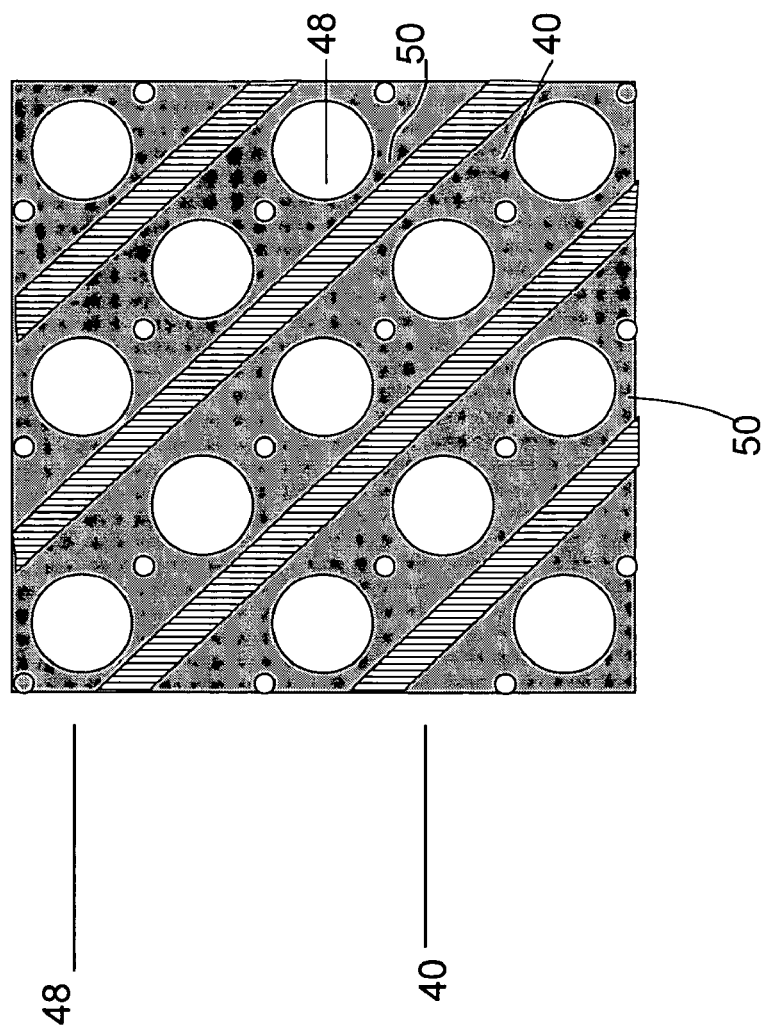
FIG. 4a is a top view of the first manifold plate of the inventive die assembly showing the primary feed holes, the second set of secondary feed holes and a first set diagonal channels for manifolding the first set of secondary feed holes, along with a slot for receiving material from the second feed.

First manifold plate 14 which is positioned upstream of or adjacent die outlet face 20 acts to regulate the flow of secondary material from first source 44 (FIG. 1). A plan view of first manifold plate 14 is presented in FIG. 4*a,* and includes a first set of apertures 48 corresponding to primary feedholes 38, a second set of apertures 50 corresponding to the second set of secondary feedholes 36, and first feeds 40 which communicate with and supply secondary material to the first set of secondary feedholes 34. First feeds 40 are arranged diagonally. First manifold plate 14 also includes a secondary feed slot 28 for receiving secondary material from second source 46 and transmitting it to the second manifold plate 16.

Figure 4B:
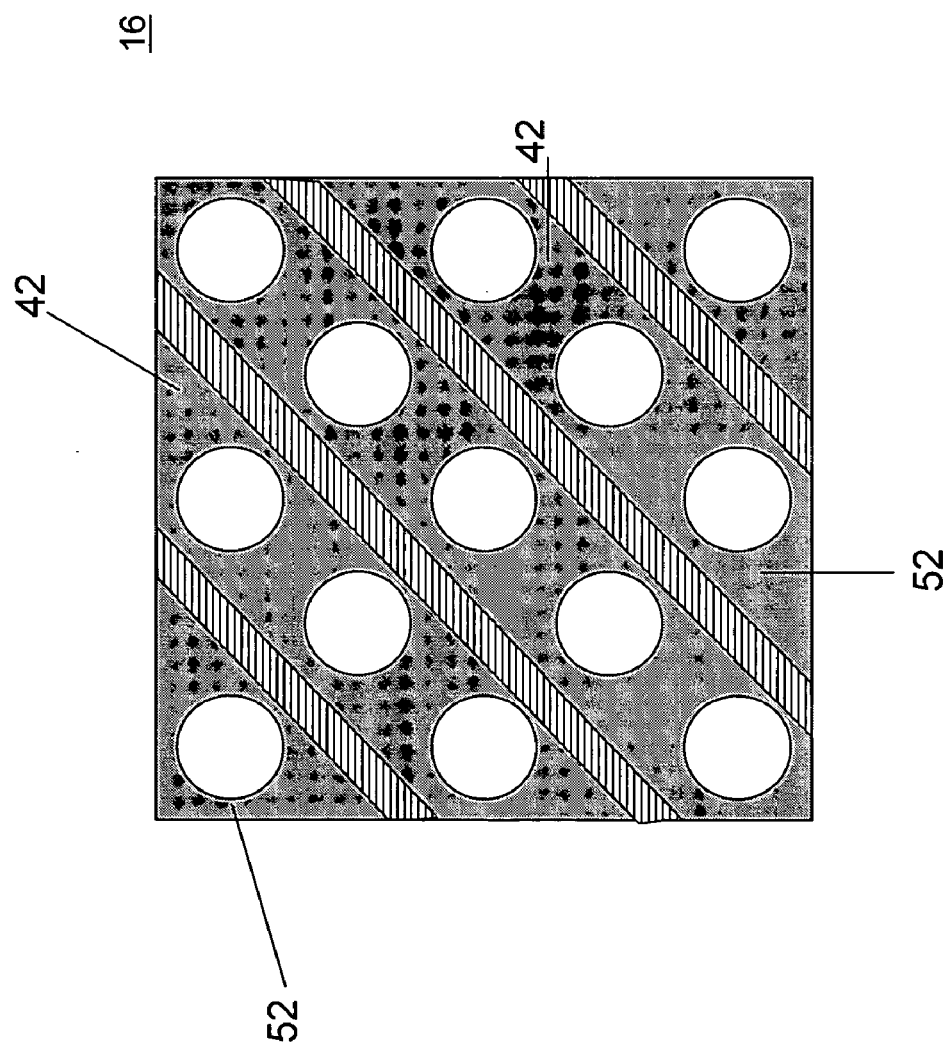
FIG. 4b is a top view of the second manifold plate of the inventive die assembly showing the primary feed holes and a second set of diagonal channels for manifolding the second set of secondary feed holes, the second set of diagonal channels being oriented at 90 degrees relative to the first set of diagonal channels.

The second manifold plate 16, presented in FIG. 4*b,* is preferably positioned upstream to and adjacent first manifold plate 14, and acts to intermittently regulate the flow of secondary material from second source 46. Similarly to the first manifold plate 14, second manifold plate 16 includes a set of apertures 52 corresponding to both the first set of apertures 48 on the first manifold plate 14, and the primary feedholes 38 on die body 12. Also provided are second feeds 42 which are arranged diagonally across the face of the second manifold plate 16. The channels of the first and second manifold plates are preferably oriented at 90 degrees relative to one another.

In operation the batch material flowing in the direction of arrow A and towards the die body 12 first encounters second manifold plate 16, then the first manifold plate 14, after which it is extruded through honeycomb die 22. The secondary material flows from first and second sources preferably in a direction opposite the batch material, as indicated by arrow B. Specifically, secondary material from both sources first encounters and passes through die body 12. Then, secondary material from first source 44 is distributed to first feeds 40 on the first manifold plate 14, and then to the first set of secondary feedholes 34. As the honeycomb is being extruded secondary material from the first set of secondary feedholes 34 is introduced into corresponding honeycomb channels (i.e., the cell channels which are formed around the pins containing the first set of secondary feedholes).

Secondary material from the second source feed 46 passes through die body 12, subsequently through first manifold plate 14, to reach second feeds 42 where it is distributed back through the first manifold plate 14, and thereafter to the second set of secondary feedholes 36. From there the secondary material from second source 46 is introduced into the honeycomb channels which are formed around pins containing the second set of secondary feedholes 36. Therefore, according to an aspect of the present invention, secondary material from at least two different sources can be readily and intermittently introduced into various cell channels of a honeycomb structure as it is being extruded.

The extrusion die assembly described above can be manufactured using existing methods for making extrusion dies. The honeycomb die region on the die body can be made by machining holes in a lower portion of a block that is made of machinable material. These holes would serve as the primary feedholes. A process such as wire electrical discharge machining (EDM) can be used to cut the extrusion slots in the upper portion of the block. Pins remain on the upper portion of the block after the slots are cut. Holes corresponding to the secondary feedholes can then be machined in the pins. The first and second backplates can then be machined with corresponding apertures and feeds using similar methods.

Figure 5A:
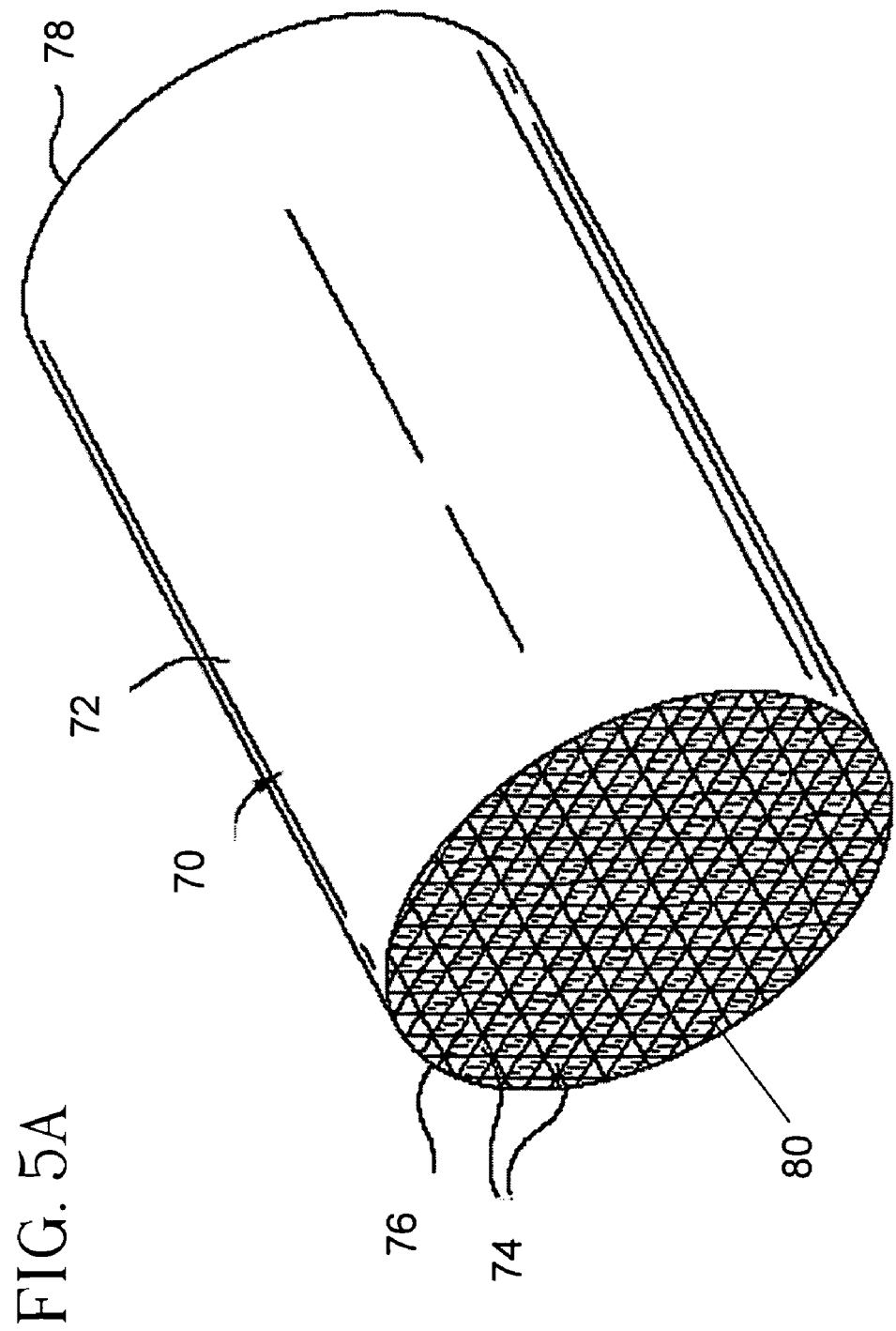
FIG. 5a is a perspective view of a wall-flow filter which is useful in the treatment of diesel exhaust.

The inventive die assembly is particularly useful in the fabrication of wall-flow diesel particulate filters. A solid particulate filter body of the type being referred to is illustrated in FIGS. 5*a-b.* FIG. 5*a* shows a filter 70 having a honeycomb body 72 which includes a plurality of parallel end-plugged cell channels 74 traversing the body from an inlet face 76 to an opposite or outlet end face 78. Alternating cell channels 78 are plugged with plugs 80.

FIG. 5*b* shows the pattern of exhaust flow through the filter body 70. Exhaust flow which is in the direction indicated by the arrow denoted by the letter C, passed from the inlet face 76 into open cell channels, but because of the blocking effect of plugs 80 at outlet face 78, the exhaust under some pressure than passes through pore or open porosity in cell walls 82, at the top, bottom and both sides of adjacent cell channels 78. While the exhaust passes through the entirety of the cell walls 82, their porosity is such as to restrain particulates therein and thereon as porous accumulation. The exhaust then flows out of the open cells at the outlet face 78.

In the extrusion of honeycomb substrates a batch material is prepared from a mixture of raw materials and organic constituents that may include plasticizers, lubricants, binders and solvents, to form a plasticized mixture. The inventive die assembly is especially suitable in the extrusion of cordierite ($Mg_2Al_4Si_5O_{18}$) structures which are formed from raw materials such as talc, alumina, silica and kaolin, and organic constituents. U.S. Pat. No. 6,541,407 provides a composition for cordierite honeycombs suitable for the present invention. However, other suitable materials may be employed as well.

Figure 6A:
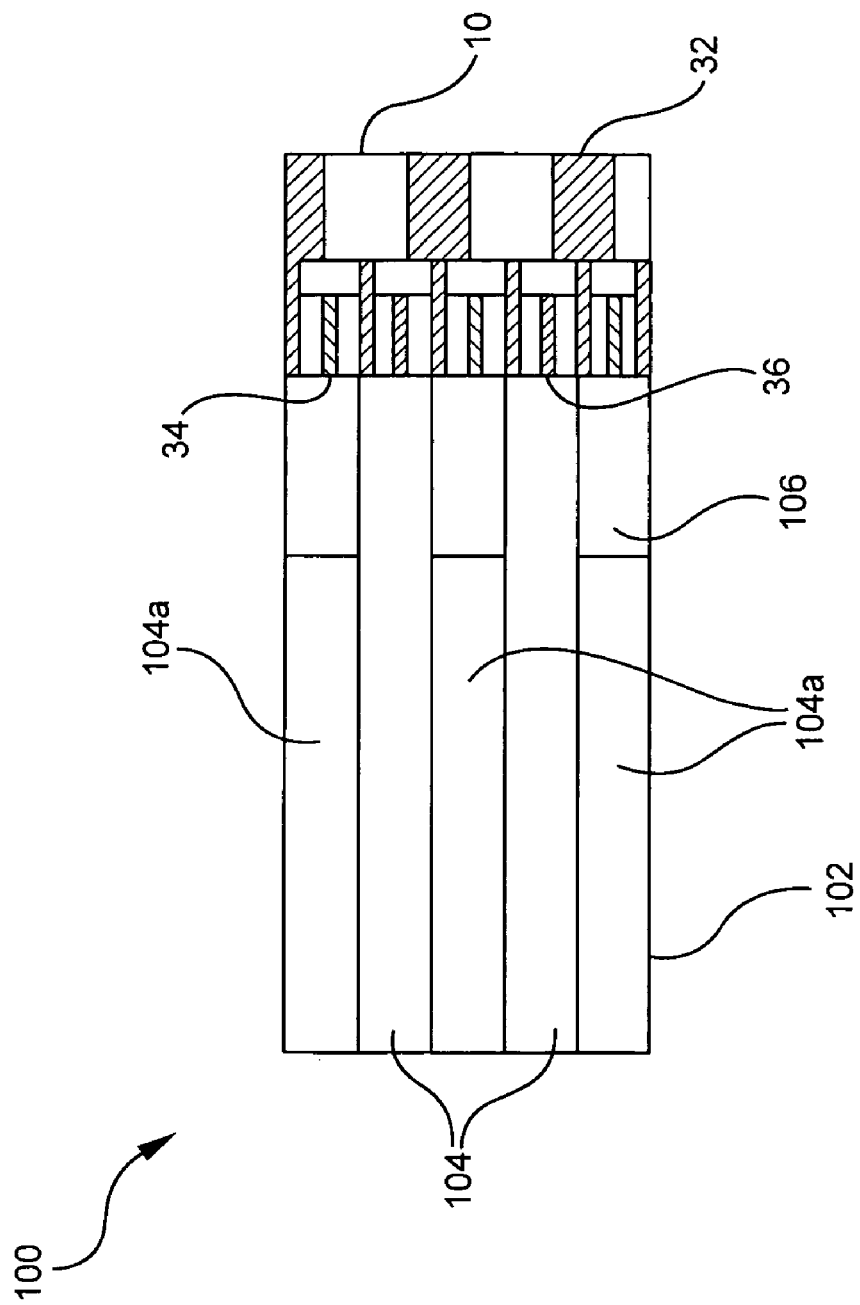
Figure 6B:
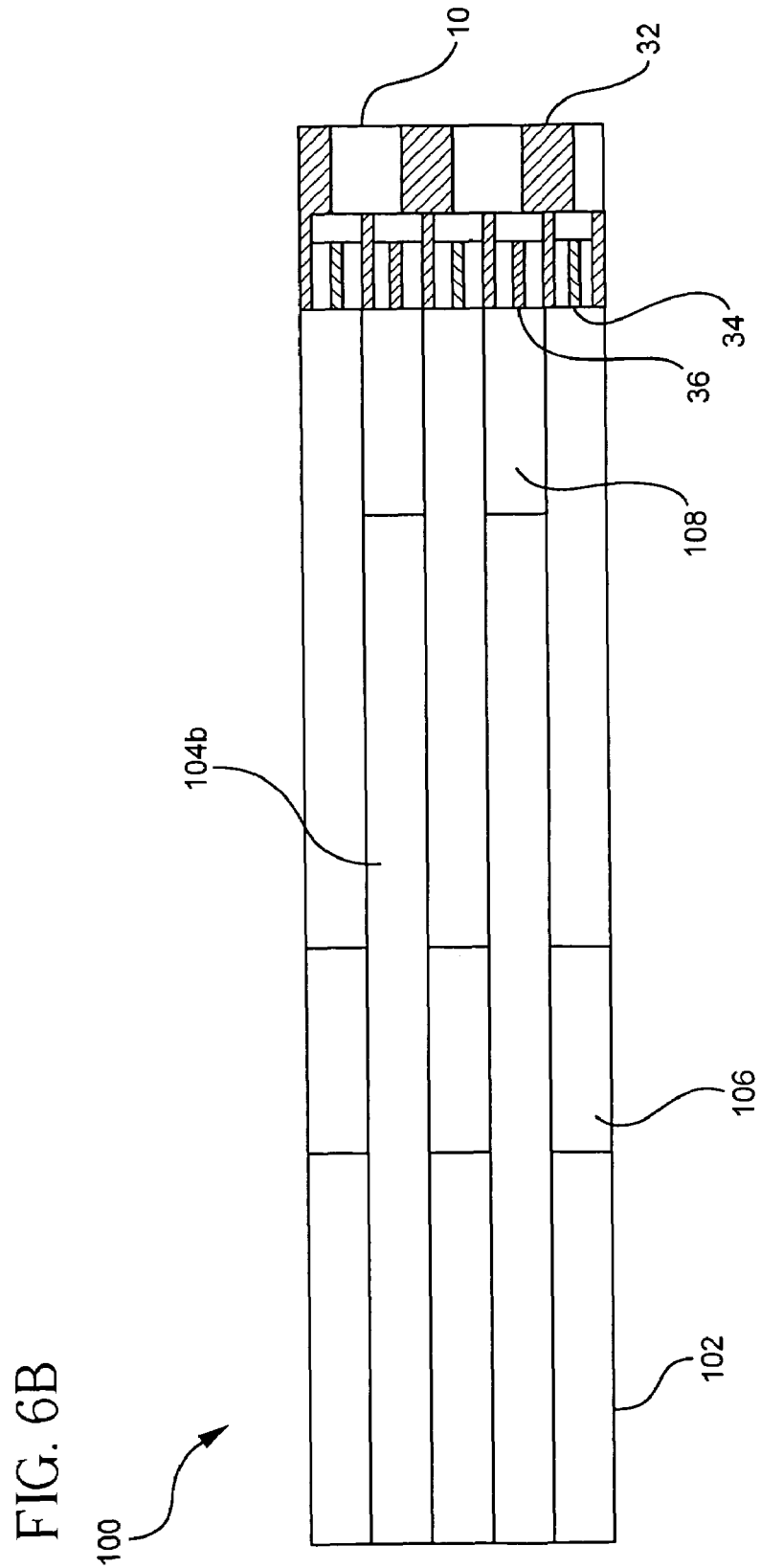
Figure 6C:
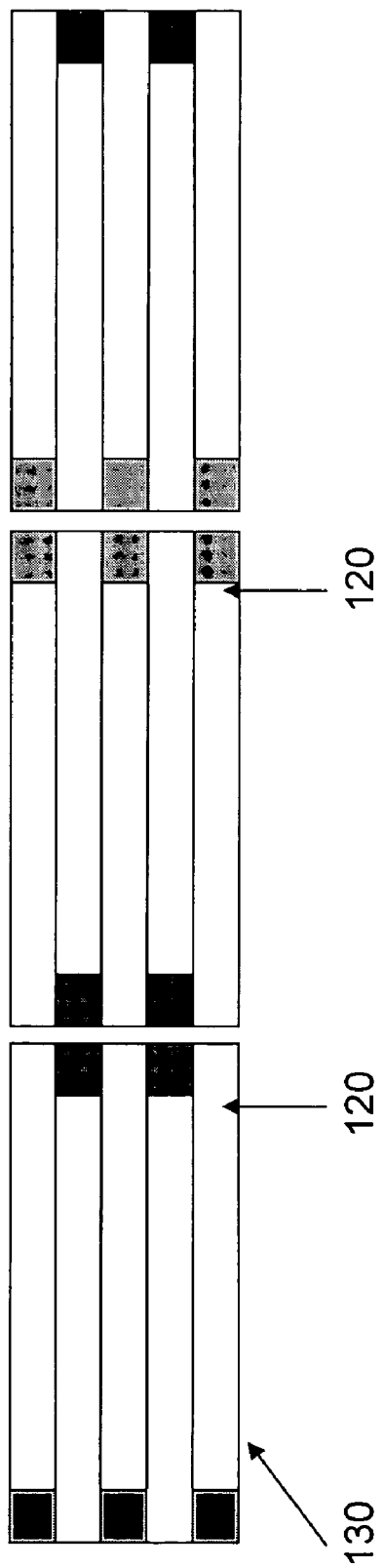

One embodiment relating to a process for making a wall-flow filter is illustrated in FIGS. 6*a-c.* In FIG. 6*a* a honeycomb log 100 is shown exiting die assembly 10 illustrated in FIG. 1. Honeycomb log 100 has a columnar body 102, the cross-sectional shape of which is square. An array of parallel, straight channels 104 is formed in the columnar body 102, each channel 104 having a square cross-section.

As the honeycomb log 100 is extruded, plugging material from a first source (not shown) is injected into a first group of honeycomb channels 104*a.* As shown plugging material is injected into alternating channels 104*a* to form plugs 106. The amount of material injected depends on the application desired, but plug depth typically ranges from between 0.04 in (1 mm) to 0.60 in (15.5 mm).

Subsequently, another batch of plugging material from a second source (not shown) is injected a distance downstream into the extruding honeycomb log 100 at a predetermined distance. The second set of plugs 108 are formed in a second group of honeycomb channels 104 which were not previously plugged. The location of the second set of plugs 108 depends on the final length of honeycomb substrate and can be easily determined by one skilled in the art. In practice plugging material from the two sources is periodically injected into the honeycomb log for the duration of the extrusion of the honeycomb log. Thus, each log includes multiple plug segments other than at the ends thereof.

To obtain a honeycomb substrate with end-plugged cells at both the inlet and outlet ends, the honeycomb log is cut by means known in the industry, such as for example a saw. By sawing the honeycomb log at the plugged portions, the resulting honeycomb substrates have an inlet face or end with part of the total number of cell channels plugged along a portion of their lengths, and the remaining part of the cells that are open at the inlet end are plugged at the outlet end along a portion of their lengths, as shown in FIG. 6c. In this configuration engine exhaust passing through the cells of the honeycomb from the inlet end to the out let flows into the open cells, through the cell walls, and out of the structure through the open cells at the outlet end.

The previously described method of making a wall-flow diesel particulate filter using the inventive die assembly involved direct plugging of honeycomb channels during extrusion. Another embodiment contemplates an indirect method of plugging a honeycomb substrate. Specifically, a release secondary material is injected on the inside of alternating honeycomb channels as the honeycomb is being extruded in a similar manner as described above for the formation of permanent plugs. By release material is meant a material that includes a fugitive component capable of melting, evaporating, volatizing, or burning-off during sintering, such as graphite or the like. The release secondary material need not fill the diameter of the cell channels entirely, but may only coat them.

Subsequently the honeycomb log is cut to form honeycomb substrates of desired length. The resulting honeycomb substrates have a portion of the cell channels at each end coated or filled with a release secondary material. A plugging cement paste is then spread across the face of the honeycomb substrate and pushed into the ends of all cell channels.

Plugging cements are described in U.S. Pat. Nos. 4,297,140, 4,293,357, and 4,559,193. Plugging cement is typically used in conjunction with a mask. The mask which is made of flexible rubber or other material has holes through which the plugging cement is pushed into the ends of the channels.

A plugging mask is not needed because the release material acts to create temporary plugs which are removed following drying or sintering. Specifically, as the honeycomb substrate is fired the secondary material containing the release agent burns off leaving a gap between the plug and the sides of the cell walls. Since the plugs do not adhere to the cell walls they can be removed by any suitable means such as shaking, sticky fabric, tape and the like. Whereas, in the cells absent the release agent, as the plugging cement hardens it forms a bond with the sides of the cell walls adhering thereto to form permanent plugs.

The invention provides one or more advantages. The invention provides a method for forming a wall-flow honeycomb which combines extrusion and plugging in one process. A modified die having secondary feedholes machined in the pins allows plugging material to be periodically injected into cell channels during extrusion.

What is claimed:

1. A method of manufacturing a honeycomb structure, comprising the steps of:
   extruding a first material supply through a die to form a honeycomb log having a plurality of intersecting, interior walls forming parallel cell channels, and
   throughout the step of extruding, intermittently regulating flow of a second batch material supply into the cell channels,
   wherein the die includes
      (i) a die body having an inlet face, an outlet face, and a honeycomb die region, wherein the honeycomb die region includes an array of slots which define an array of pins, wherein the pins further include first and second sets of secondary feedholes; and,
      (ii) at least a first manifold plate and a second manifold plate, wherein the manifold plates include feed channels and secondary feedholes for supplying and regulating the second batch material from feed sources;
   the step of regulating includes periodically injecting a portion of the cell channels with the second batch material through the secondary feedholes as the honeycomb log is being extruded; and
   cutting the honeycomb log at an interface between the second batch material and cell channels, such that there results a honeycomb structure having a first portion of end-plugged cell channels at one end and a second portion of end-plugged cell channels at the other end, but not corresponding to the first portion.

2. The method according to claim 1 wherein the die assembly comprises (i) a first back plate positioned upstream of the die outlet face for supplying and regulating the second batch material from a first feed source to the first set of secondary feedholes; and, (ii) a second back plate positioned adjacent to the first back plate for supplying and regulating the second batch material from a second feed source to the second set of secondary feedholes.

3. The method according to claim 2 wherein the second batch material comprises a release agent.

4. The method according to claim 3 wherein the second batch material forms temporary plugs after drying by preventing the second batch material from adhering to the interior walls of the cell channels.

5. The method according to claim 4 wherein plugging material capable of forming permanent plugs is spread across the ends of the honeycomb substrate and pushed into cell ends.

* * * * *